US009545825B2

United States Patent
Tamura

(10) Patent No.: US 9,545,825 B2
(45) Date of Patent: Jan. 17, 2017

(54) PNEUMATIC TIRE WITH TREAD HAVING SHOULDER CIRCUMFERENTIAL GROOVES

(75) Inventor: Daisuke Tamura, Kodaira (JP)

(73) Assignee: Kabushiki Kaisha Bridgestone, Tokyo (JP)

( * ) Notice: Subject to any disclaimer, the term of this patent is extended or adjusted under 35 U.S.C. 154(b) by 514 days.

(21) Appl. No.: 14/001,599

(22) PCT Filed: Feb. 24, 2012

(86) PCT No.: PCT/JP2012/054608
§ 371 (c)(1),
(2), (4) Date: Sep. 20, 2013

(87) PCT Pub. No.: WO2012/115237
PCT Pub. Date: Aug. 30, 2012

(65) Prior Publication Data
US 2014/0000775 A1 Jan. 2, 2014

(30) Foreign Application Priority Data

Feb. 25, 2011 (JP) .................................. 2011-040384
Mar. 16, 2011 (JP) .................................. 2011-057438

(51) Int. Cl.
*B60C 11/12* (2006.01)
*B60C 11/13* (2006.01)
(Continued)

(52) U.S. Cl.
CPC ........ *B60C 11/1315* (2013.04); *B60C 11/0309* (2013.04); *B60C 11/04* (2013.01);
(Continued)

(58) Field of Classification Search
CPC ............... B60C 11/125; B60C 11/1323; B60C 11/1315; B60C 2011/133
See application file for complete search history.

(56) References Cited

U.S. PATENT DOCUMENTS

2006/0254684 A1* 11/2006 Tamura ............... B60C 11/0306
152/209.18
2010/0326577 A1* 12/2010 Iwai .................... B60C 11/0309
152/209.24
2011/0232816 A1* 9/2011 Sheehan ............... B60C 11/042
152/209.24

FOREIGN PATENT DOCUMENTS

EP 0 520 755 A1 12/1992
JP 60-203505 A * 10/1985
(Continued)

OTHER PUBLICATIONS

Machine translation for Japan 2007-001434 (no date).*
(Continued)

*Primary Examiner* — Steven D Maki
(74) *Attorney, Agent, or Firm* — Sughrue Mion, PLLC

(57) ABSTRACT

The invention controls irregular wear in the shoulder land portions and reduces the occurrence of cracking in the shoulder grooves of a pneumatic tire. To that end, the groove wall surface (17a) on the shoulder land portion (19) side of the shoulder groove (17) has an inclined surface consisting of a first inclined part (171) inclined toward the equatorial plane of the tire at an inclination angle $\theta_1$, which is constant along the circumference of the tire, and a second inclined part (172) further inclined from the first inclined part (171) toward the equatorial plane of the tire and reaching the groove bottom (17b) of the shoulder groove (17) at an angle $\alpha$ with respect to the first inclined part (171), which varies along the circumference of the tire. Also, the inclination angles of the first and second inclined parts (171, 172) are set such that the maximum value $\alpha_{max}$ and the minimum value $\alpha_{min}$ of the angle $\alpha$ satisfy (D-d) (tan $\alpha_{max}$-tan $\alpha_{min}$)≥2.5 where D is the depth from the tread face to the bottom of the shoulder groove (17), d is the depth from the tread face to the boundary position between the first inclined (Continued)

part (171) and the second inclined part (172), $\alpha_{max}$ is the maximum value of the angle $\alpha$, and $\alpha_{min}$ is the minimum value of the angle $\alpha$.

3 Claims, 5 Drawing Sheets

(51) Int. Cl.
  *B60C 11/04* (2006.01)
  *B60C 11/03* (2006.01)
(52) U.S. Cl.
  CPC .......... *B60C 11/042* (2013.04); *B60C 11/045* (2013.01); *B60C 11/125* (2013.04); *B60C 11/1323* (2013.04); *B60C 2011/0355* (2013.04); *B60C 2011/1254* (2013.04); *B60C 2011/133* (2013.04)

(56) References Cited

FOREIGN PATENT DOCUMENTS

| JP | 06-156017 A | | 6/1994 |
| JP | 08-058317 A | * | 3/1996 |
| JP | 08058317 A | | 3/1996 |
| JP | 09-11708 A | | 1/1997 |
| JP | 2005-193795 A | | 7/2005 |
| JP | 2007-001434 A | * | 1/2007 |
| JP | 2007-001434 A | | 1/2007 |
| JP | 2008-012969 A | * | 1/2008 |
| JP | 2010-018125 A | | 1/2010 |

OTHER PUBLICATIONS

Machine translation for Japan 08-058317 (no date).*
Machine translation for Japan 60-203505 (no date).*
Machine translation for Japan 2008-012969 (no date).*
Partial translation for Japan 08-058317 (no date).*
English Translation of International Preliminary Report on Patentability for PCT/JP2012/054608 dated Sep. 6, 2013.
International Search Report of PCT/JP2012/054608 dated May 29, 2012.
Communication dated Apr. 1. 2015, issued by the Japanese Patent Office in counterpart Application No. 2011057438.
Communication dated Jul. 26, 2016, issued by the European Patent Office in corresponding European Application No. 12749496.1.

* cited by examiner

FIG. 3

| | θ1 [deg] | d [mm] | D [mm] | αmax [deg] | αmin [deg] | d/D | (D−d)×Δ | CURB HITTING COUNT BEFORE RIB TIRE | IRREGULAR WEAR VOL. ($10^3$ mm$^3$) | | | |
|---|---|---|---|---|---|---|---|---|---|---|---|---|
| | | | | Dimension | | | | | 1 | 2 | 3 | 4 |
| CONVENTIONAL EXAMPLE | 6 | — | 17.5 | 0.0 | 0.0 | — | — | 6 | 0.5 | 2.0 | 3.5 | 6.0 |
| INVENTION 1 | 6 | 6.0 | 16.7 | 16.0 | 0.0 | 0.36 | 3.1 | 16 | 0.2 | 1.1 | 3.4 | 4.5 |
| INVENTION 2 | 6 | 7.0 | 17.5 | 18.0 | 4.0 | 0.40 | 2.7 | 14 | 0.1 | 1.4 | 3.2 | 4.8 |
| COMPARATIVE EXAMPLE 1 | 6 | 6.0 | 17.0 | 15.0 | 5.0 | 0.35 | 2.0 | 8 | 0.4 | 2.0 | 3.8 | 5.8 |
| COMPARATIVE EXAMPLE 2 | 6 | 1.5 | 18.0 | 15.0 | 0.0 | 0.10 | 4.4 | 16 | 0.5 | 3.0 | 5.5 | 8.4 |
| COMPARATIVE EXAMPLE 3 | 6 | 11.0 | 17.0 | 24.0 | 0.0 | 0.65 | 2.7 | 7 | 0.3 | 2.2 | 3.5 | 6.0 |

$\Delta = (\tan\alpha\max - \tan\alpha\min)$

FIG. 5A    SPECIFICATIONS

| | θ1 [deg] | d [mm] | D [mm] | d/D | l [mm] | w [mm] | l/w | αmax [deg] | αmin [deg] | (D-d)×Δ |
|---|---|---|---|---|---|---|---|---|---|---|
| CONVENTIONAL EXAMPLE | 6 | — | 17.5 | — | — | — | — | 0.0 | 0.0 | — |
| INVENTION 1 | 6 | 6.0 | 16.7 | 0.4 | — | — | — | 16.0 | 0.0 | 3.1 |
| INVENTION 2 | 6 | 7.0 | 17.5 | 0.4 | — | — | — | 18.0 | 4.0 | 2.7 |
| INVENTION 3 | 6 | 6.0 | 16.7 | 0.4 | 5.7 | 2.0 | 2.9 | 16.0 | 0.0 | 3.1 |
| INVENTION 4 | 6 | 7.0 | 17.5 | 0.4 | 5.7 | 2.0 | 2.9 | 18.0 | 4.0 | 2.7 |
| COMPARATIVE EXAMPLE 4 | 6 | 6.0 | 17.0 | 0.4 | 5.0 | 3.0 | 1.7 | 15.0 | 5.0 | 2.0 |

$\Delta = (\tan\alpha max - \tan\alpha min)$

FIG. 5B    TEST RESULTS

| | CURB HITTING COUNT BEFORE RIB TIRE | OCCURENCE OF SIPE TEAR | IRREGULAR WEAR VOL. ($10^3$ mm$^3$) | | | |
|---|---|---|---|---|---|---|
| | | | 1 | 2 | 3 | 4 |
| CONVENTIONAL EXAMPLE | 6 | ABSENT | 0.5 | 2.0 | 3.5 | 6.0 |
| INVENTION 1 | 16 | ABSENT | 0.2 | 1.1 | 3.4 | 4.5 |
| INVENTION 2 | 14 | ABSENT | 0.1 | 1.4 | 3.2 | 4.8 |
| INVENTION 3 | 19 | ABSENT | 0.2 | 1.1 | 3.3 | 4.2 |
| INVENTION 4 | 17 | ABSENT | 0.1 | 1.4 | 3.1 | 4.5 |
| COMPARATIVE EXAMPLE 4 | 8 | ABSENT | 0.4 | 2.0 | 3.8 | 5.0 |

PNEUMATIC TIRE WITH TREAD HAVING SHOULDER CIRCUMFERENTIAL GROOVES

CROSS REFERENCE TO RELATED APPLICATIONS

This is a National Stage of International Application No. PCT/JP2012/054608 filed Feb. 24, 2012, claiming priority based on Japanese Patent Application Nos. 2011-040384 filed Feb. 25, 2011 and 2011-057438 filed Mar. 16, 2011, the contents of all of which are incorporated herein by reference in their entirety.

TECHNICAL FIELD

The present invention relates to the prevention of cracking in shoulder grooves and the improvement of performance against irregular wear in the shoulder land portions of a pneumatic tire which has riblike land portions formed in the shoulder regions.

BACKGROUND ART

Pneumatic tires having riblike land portions in the shoulder regions (shoulder land portions) continuously along the circumference of the tire, such as heavy-duty pneumatic tires, are subject to heavy loads on the shoulder land portions when the vehicle accelerates, decelerates, or makes turns. A conventional problem with such pneumatic tires, therefore, has been the frequent occurrence of irregular wear in the shoulder land portions or cracking in the shoulder grooves.

In a proposed method for controlling irregular wear in the shoulder land portions, the inclination of the wall surface of the shoulder land portion facing a shoulder groove, for instance, is varied at predetermined intervals along the circumference of the tire (see Patent Document 1, for instance).

On the other hand, proposed methods for reducing the occurrence of cracking in shoulder grooves have relied on enlargement of the groove bottom radius of shoulder grooves, provision on the wall surface facing the shoulder groove of the shoulder land portion a first inclined part inclining toward the groove center from the perpendicular line from the tread face of the shoulder land portion and a second inclined part inclining further inclining toward the groove center from the first inclined part, and the like so as to raise the rigidity of the shoulder land portions (see Patent Documents 2 and 3, for instance).

PRIOR ART DOCUMENT

Patent Document

Patent Document 1: Japanese Unexamined Patent Application Publication No. 9-11708
Patent Document 2: Japanese Unexamined Patent Application Publication No. 2005-193795
Patent Document 3: Japanese Unexamined Patent Application Publication No. 2007-1434

SUMMARY OF THE INVENTION

Problem to be Solved by the Invention

However, the method of varying the inclination of the wall surface of the shoulder land at predetermined intervals along the circumference of a tire has achieved a certain degree of reduction in the occurrence of irregular wear, but has failed to reduce the occurrence of cracking in the shoulder grooves. On the other hand, the method of enhancing the rigidity of the shoulder land portions has failed to reduce the occurrence of irregular wear.

Also, the method of providing the first and second inclined parts on the wall surface of the shoulder land portions has not only failed to effectively reduce the strain (distortion) in the groove bottom when the vehicle has driven over a curb, but also has caused creasing along the boundary between the first inclined part and the second inclined part, giving rise to the possibility of cracking in the shoulder groove from the crease. Note, however, that this depended on the varying inclination angle $\alpha$ ($=\theta_2-\theta_1$), which is the difference between the inclination angle $\theta_1$ of the first inclined part and the inclination angle $\theta_2$ of the second inclined part, and the relationship between the depth D of the shoulder groove and the position d of the boundary between the first inclined part and the second inclined part.

The present invention has been made in view of these past problems, and an object thereof is to provide a pneumatic tire capable of sufficiently control irregular wear of the shoulder land portions and reducing the occurrence of cracking in the shoulder grooves.

Means for Solving the Problem

In one aspect, the present invention provides a pneumatic tire including a tread having, on one of its surfaces, a plurality of circumferential grooves, which extend along the circumference of the tire, and shoulder land portions defined by shoulder grooves, which are circumferential grooves located in the axially outermost positions of the circumferential grooves. And a groove wall surface located on the shoulder land portion side of the shoulder groove has a first inclined part, which is inclined toward the equatorial plane of the tire from a direction perpendicular to the tread face of the shoulder land portion, and a second inclined part, which is further inclined toward the equatorial plane from the first inclined part and reaches the bottom of the shoulder groove. Also, the inclination angle of the first inclined part is constant along the circumference of the tire, and the angle $\alpha$ formed by the first inclined part and the second inclined part varies along the circumference of the tire. And the maximum value $\alpha_{max}$ and the minimum value $\alpha_{min}$ of the angle $\alpha$ satisfy (D-d) (tan $\alpha_{max}$-tan $\alpha_{min}$)≥2.5 where D is the depth from the tread face to the bottom of the shoulder groove, d is the depth from the tread face to the boundary position between the first inclined part and the second inclined part, $\alpha_{max}$ is the maximum value of the angle $\alpha$, and $\alpha_{min}$ is the minimum value of the angle $\alpha$.

As a result, it is not only possible to reduce the occurrence of creasing in the wall surfaces of the shoulder land portions but also to effectively reduce strain (distortion) in the groove bottom when the tire runs on a curb.

In another aspect, the present invention provides a pneumatic tire in which the inclination angle $\theta_1$ of the first inclined part is within a range of $0°<\theta_1\leq10°$ and the angle $\alpha$ is within a range of $0°\leq\alpha<20°$. Hence, premature wear and irregular wear in the shoulder land portions can be reduced reliably.

In yet another aspect, the invention employs the depth d which satisfies $0.1<(d/D)<0.6$. Hence, irregular wear can be reduced while maintaining the rigidity of the shoulder land portions.

In a further aspect, the present invention provides a pneumatic tire in which the shoulder land portions have each a plurality of land-portion sipes which are arranged along the circumference of the tire, open into the shoulder groove, and are at an angle perpendicular to the groove wall surface.

It is to be noted that the plurality of land-portion sipes may be located at regular intervals or at irregular intervals along the circumference of the tire.

This arrangement can suppress the increase of shearing force to work on the shoulder land portions when any lateral force is inputted, thereby further controlling irregular wear in the shoulder land portions.

In a yet further aspect, the present invention provides a pneumatic tire in which the second inclined part has a plurality of groove-bottom sipes which are arranged along the circumference of the tire and open into the shoulder groove.

This arrangement will realize both the controlling of wear in the shoulder regions and the controlling of the concentration of strain in the groove bottom of the shoulder grooves. The arrangement can also suppress the increase of shearing force when any lateral force is inputted. Thus it is possible to reliably control the occurrence of rib tear and irregular wear in the shoulder regions.

In still another aspect, the present invention provides a pneumatic tire in which the direction of extension of each of the groove-bottom sipes as viewed from the tread face side of the tire is perpendicular to a straight line or a curved line connecting boundary points between the groove bottom of the shoulder groove and the second inclined part.

As a result, it is possible to suppress the increase of shearing force to work on the shoulder ribs when any lateral force is inputted, while controlling the occurrence of sipe tear. Thus, irregular wear of the shoulder ribs can be further controlled.

In yet another aspect, the present invention provides a pneumatic tire in which I and w satisfy $1.5<(I/w)<4$ where w is the length of the groove-bottom sipe along the groove wall surface and I is the interval between the opening of a groove-bottom sipe and the opening of a groove-bottom sipe adjacent thereto along the circumference of the tire.

This will optimize the density of the groove-bottom sipes in the groove wall of the shoulder grooves. As a result, the occurrence of sipe tear can be controlled while retaining the rigidity of the inclined part. Also, the irregular wear in the shoulder regions can be controlled by suppressing the shearing deformation when lateral forces are inputted.

It is to be understood that the foregoing summary of the invention does not necessarily recite all the features essential to the invention, and subcombinations of all these features are intended to be included in the invention.

BRIEF DESCRIPTION OF THE DRAWINGS

FIG. 3 is a table showing the results of performance tests of tires according to the first embodiment.

FIGS. 5A and 5B are tables showing the results of performance tests of tires according to the second embodiment.

BEST MODE FOR CARRYING OUT THE INVENTION

The invention will now be described based on preferred embodiments which do not intend to limit the scope of the claims of the present invention but exemplify the invention. All of the features and the combinations thereof described in the embodiments are not necessarily essential to the invention.

First Embodiment

Figure 1A:
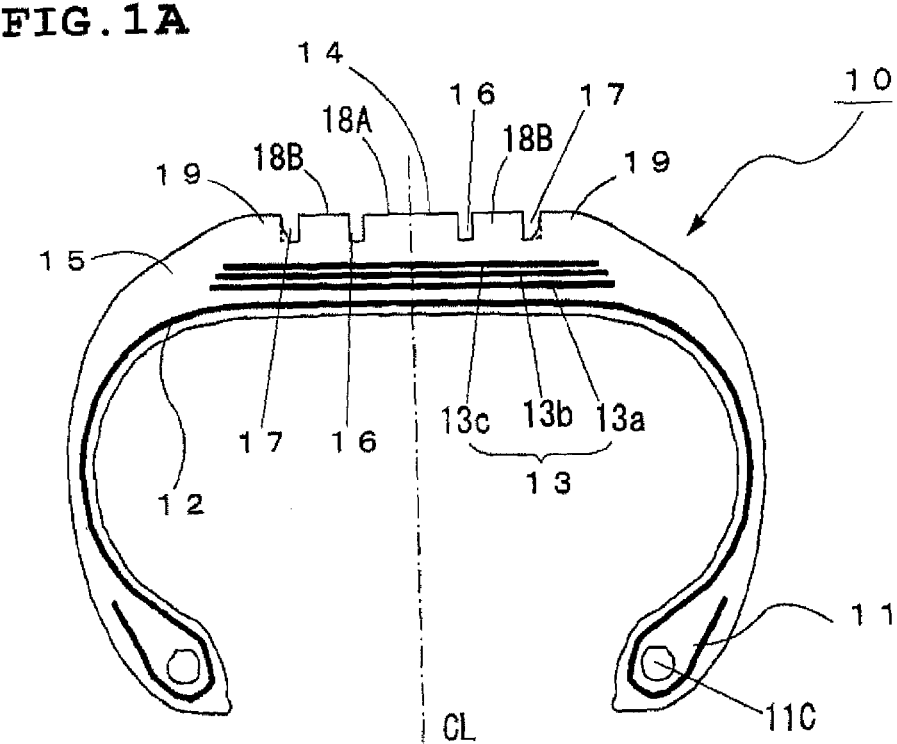
FIGS. 1A and 1B are diagrams showing an example of a pneumatic tire according to a first embodiment of the invention.
Figure 1B:
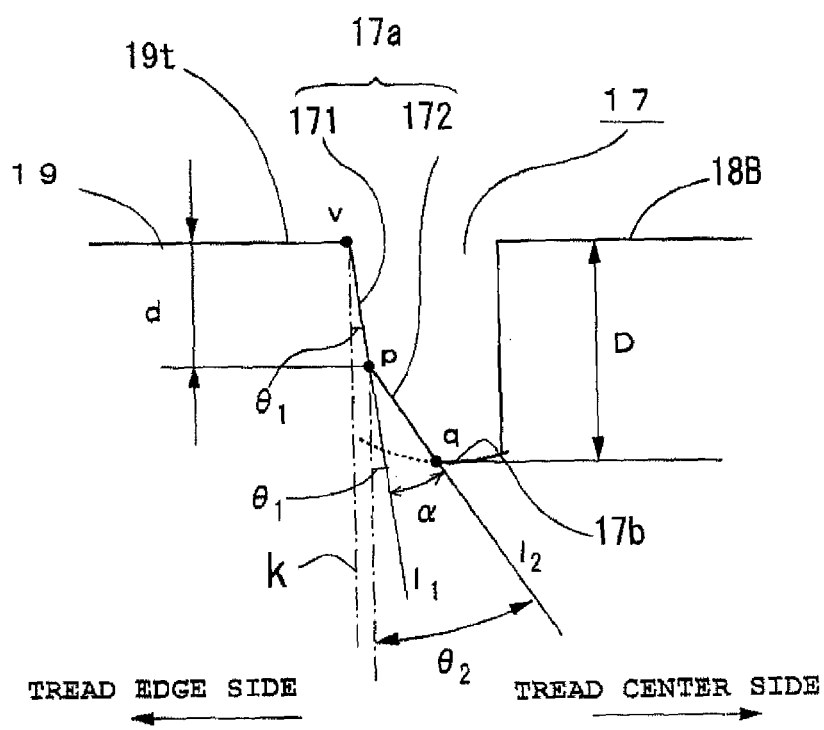

FIGS. 1A and 1B are diagrams showing a structure of a pneumatic tire (hereinafter referred to as "tire") 10 according to a first embodiment of the present invention. FIG. 1A is a cross-sectional view of the tire 10, whereas FIG. 1B is a feature enlarged view of a vicinity of a shoulder groove 17.

In FIG. 1A, reference numeral 11 represents a bead portion, 11C a bead core, 12 a carcass layer, 13 belt layers, 14 a tread, and 15 a sidewall area. Note that CL shown by a chain line in the figure is the center line of the wheel (equatorial plane of the tire).

The carcass layer 12 is a skeletal member of the pneumatic tire 10 which is toroidal in shape and astriding a pair of bead cores disposed within a pair of bead portions 11. Disposed on a radially outer side of the crown part of the carcass layer 12 is the belt layers 13 consisting of three belts 13a to 13c. The belts 13a to 13c constituting the belt layers 13, which are each a steel cord or a cord of woven organic fibers, are so disposed as to cross each other at angles of 20 to 70 degrees with respect to the circumferential direction of the tire.

The tread 14 is a rubber member (tread rubber) disposed on a radially outer side of the belt layers 13. Formed in a surface of the tread 14 are circumferential grooves 16, 17 extending along the circumference of the tire. And a plurality of land portions 18A, 18B, and 19 are defined by these circumferential grooves 16, 17.

Hereinafter, the circumferential grooves 16 provided in the axially central part of the tire will be referred to as the main grooves, while the circumferential grooves 17 provided in the axially outer sides of the tire will be referred to as the shoulder grooves.

The land portion 18A, defined by two main grooves 16, is the central land portion located in the axial center of the tire. The land portions 18B, defined by the main grooves 16 and the shoulder grooves 17, are outer land portions located on each of the axially outer sides of the land portion 18A. The land portions 19, defined by the shoulder grooves 17, are riblike land portions extending continuously along the circumference of the tire on the axially outer sides of the tire. Hereinafter, the land portions 19 will be referred to as the shoulder land portions.

As shown in FIG. 1B, the pneumatic tire 10 according to the present invention is such that the wall surface of the shoulder land portion 19 on the shoulder groove 17 side, which is the groove wall surface 17a of the shoulder groove 17 on the shoulder land portion 19 side located closer to the tread edge, is inclined toward the equatorial plane of the tire. The groove wall surface 17a has different inclination angles between the tread face 19t side of the shoulder land portion 19 and the groove bottom 17b side of the shoulder groove 17. The above-mentioned inclination angles refer to the angles of the groove wall surface 17a with respect to the line k perpendicular to the tread face 19t of the shoulder land portion 19, which is shown by chain lines in the figure.

Hereinafter, the groove wall surface 17a on the tread face 19t side of the shoulder land portion 19 will be referred to as the first inclined part 171, and that on the groove bottom 17b side of the shoulder groove 17 as the second inclined part 172. Also, the position p where the inclination angle changes will be referred to as the boundary between the first inclined part 171 and the second inclined part 172, and the depth d from the tread face 19t of the shoulder land portion 19 to the boundary p will be referred to as the boundary depth.

The inclination angle $\theta_1$ of the first inclined part 171 is the angle formed between a plane including the first inclined part 171 and a plane parallel to the equatorial plane of the tire. Seen in a cross section of the tire, it is the angle between the line k perpendicular to the tread face 19t of the shoulder land portion 19 and the straight line $I_1$ extending the first inclined part 171 as shown in FIG. 1B.

Note that when the shape of the first inclined part 171 includes any curved surface or fine serrations, the inclination angle $\theta_1$ is to be the angle formed by the straight line $I_1$ passing through the edge v of the first inclined part 171 on the tread face 19t side of the shoulder land portion 19 and the boundary p in the cross section of the tire.

Figure 2A:
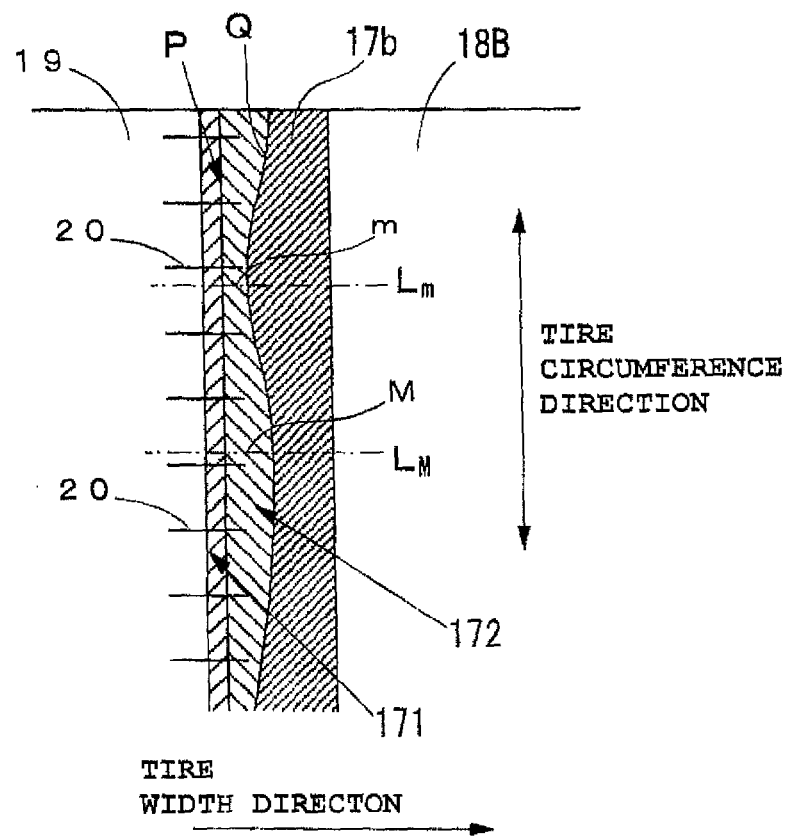
FIGS. 2A and 2B are diagrams showing shapes of inclinations of the groove wall surface of a shoulder groove.

In the present embodiment, the inclination angle $\theta_1$ is constant along the circumference of the tire, and it is within a range of $0°<\theta_1 \leq 10°$. The line P connecting the boundaries p is a straight line in parallel with the circumference of the tire as shown in FIG. 2A.

$\theta_1$ being constant makes it harder for a nucleus of irregular wear to take place in the initial stage. Also, $\theta_1$ being set at 10° or less will reduce the axial crushing of the rubber, thus producing the effect to slow the progress of irregular wear.

The second inclined part 172 is further inclined toward the equatorial plane of the tire by an angle $\alpha$ with respect to the first inclined part 171. The angle $\alpha$ will be hereinafter referred to as the varying inclination angle.

When the varying inclination angle $\alpha$ varies along the circumference of the tire, the second inclined part 172 cannot exist as a flat surface. However, the varying inclination angle $\alpha$ can be defined as the angle formed by the straight line $I_1$ delineating the first inclined part 171 and the straight line $I_2$ passing through the boundary p between the first inclined part 171 and the second inclined part 172 and the boundary q between the second inclined part 172 and the groove bottom 17b of the shoulder groove 17 in the cross section of the tire.

Also, even when the second inclined part 172 includes any curved surface or fine serrations, the varying inclination angle $\alpha$ may be defined as the angle formed by the straight line $I_1$ and the straight line $I_2$ passing through the boundary p and the boundary q in the cross section of the tire.

The inclination angle $\theta_2$ of the second inclined part 172 is: $\theta_2=\theta_1+\alpha$.

In the present embodiment, the varying inclination angle $\alpha$ is within a range of $0°<\alpha\leq 20°$, and the varying inclination angle $\alpha$ is varied along the circumference of the tire. That is, the inclination angle $\theta_2$ of the second inclined part 172 varies along the circumference of the tire. Hence, the curved line Q connecting the boundaries q between the groove bottom 17b of the shoulder groove 17 and the second inclined part 172 becomes wavy as shown in FIG. 2A.

Figure 2B:
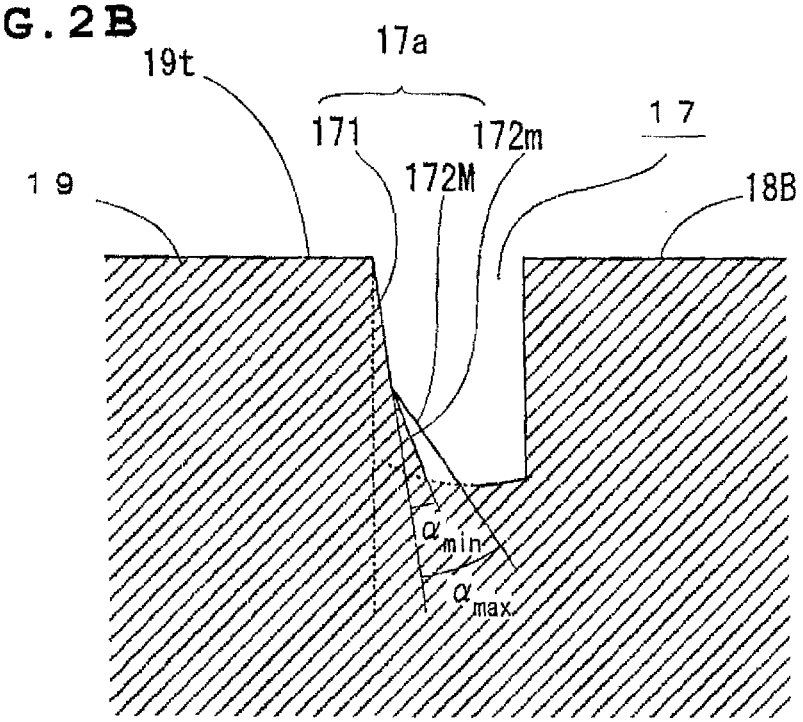

In FIG. 2A, the position indicated by the chain line m represents the minimum value $\alpha_{min}$ of the varying inclination angle $\alpha$, whereas the position indicated by the chain line M represents the maximum value $\alpha_{max}$ thereof. FIG. 2B is a sectional view seeing the position of the maximum value $\alpha_{max}$ of the varying inclination angle $\alpha$ from that of the minimum value $\alpha_{min}$ thereof.

The varying inclination angle $\alpha$ is held below 20 degrees, because with the varying inclination angle $\alpha$ of 20° or above, a crease can occur in the neighborhood of the boundary between the first inclined part 171 and the second inclined part 172. And this crease can cause cracking in the shoulder groove 17.

In the present embodiment, the inclination angle $\theta_1$ of the first inclined part 172 is constant, while the inclination angle $\theta_2$ of the second inclined part 172 is varied. Hence, from the initial stage to the middle stage of wear, the irregular wear in the shoulder land portion 19 is controlled, whereas, from the middle stage onward of wear, the concentration of strain (distortion) in the groove bottom 17b of the shoulder groove 17 is prevented as the second inclined part 172, which is varied along the circumference of the tire, is exposed toward the tread face side of the tire.

Also, in the present embodiment, the occurrence of cracking in the shoulder groove 17 is controlled by placing a limitation as expressed in the equation (1) below on the difference between the maximum value $\alpha_{max}$ and the minimum value $\alpha_{min}$ (more specifically, the tangent of the maximum value $\alpha_{max}$ and the tangent of the minimum value $\alpha_{min}$) of the varying inclination angle $\alpha$.

This limitation varies with the groove depth D of the shoulder groove 17, which is measured from the tread face 19t of the shoulder land portion 19, and the boundary depth d, which is the distance from the tread face 19t to the boundary between the first inclined part 171 and the second inclined part 172.

$$(D-d)(\tan \alpha_{max}-\tan \alpha_{min})\geq 2.5 \qquad (1)$$

Hereinbelow, $\Delta\alpha$ will be used to represent (D−d) (tan $\alpha_{max}$−tan $\alpha_{min}$); that is, (D−d) (tan $\alpha_{max}$−tan $\alpha_{min}$)=$\Delta\alpha$.

When $\Delta\alpha$ is less than 2.5, there will not be sufficient relaxation of strain in the groove bottom when the tire runs on a curb, with the result that cracking may start more easily in the shoulder groove 17.

It is to be noted that the smaller the difference between the groove depth D and the boundary depth d, the smaller the volume of the second inclined part 172 will be, and therefore (tan $\alpha_{max}$−tan $\alpha_{min}$) is multiplied by (D−d) to make the variation in the varying inclination angle $\alpha$ larger. This will work to control the concentration of strain in the groove bottom 17b of the shoulder groove 17.

Also, in the present embodiment, a limitation as expressed in the equation (2) below is given to the relationship between the groove depth D of the shoulder groove 17 and the boundary depth d. This further improves the effect of controlling irregular wear in the shoulder land portion 19 and the effect of reducing the occurrence of cracking.

$$0.1<(d/D)<0.6 \qquad (2)$$

It is to be noted that (d/D) being 0.1 or less will hasten irregular wear in the initial stage of wear because of the greater exposure of the boundary between the first inclined part 171 and the second inclined part 172 and the rise of the wavy groove form closer to the tread face 19t of the shoulder land portion 19. Also, note that (d/D) being 0.6 or more will make the volume of the second inclined part 172 smaller, thus causing a failure to sufficiently control the concentration of strain in the groove bottom 17b of the shoulder groove 17.

Further in the present embodiment, the shoulder land portion 19 is provided with a plurality of sipes 20 arranged along the circumference of the tire and opening into the shoulder groove 17 as shown in FIG. 2A. These sipes 20 (hereinafter referred to as land-portion sipes 20) extend in a direction perpendicular to the groove wall surface 17a of the shoulder groove 17 (tire width direction).

Note that the land portion sipes 20, which are located at regular intervals along the circumference of the tire in FIG. 2A, may be located at irregular intervals also.

Provision of the land portion sipes 20 in the shoulder land portion 19, which extend in a direction perpendicular to the groove wall surface 17a of the shoulder groove 17 and open into the shoulder groove 17, will suppress the increase of shearing force to work on the shoulder land portion 19 when any lateral force is inputted. This will further control the irregular wear in the shoulder land portion 19.

In the first embodiment, as described above, the groove wall surface 17a on the shoulder land portion 19 side of the shoulder groove 17 is configured as an inclined surface consisting of a first inclined part 171 inclined toward the equatorial plane of the tire at an inclination angle $\theta_1$, which is constant along the circumference of the tire, and a second inclined part 172 further inclined from the first inclined part 171 toward the equatorial plane of the tire and reaching the groove bottom 17b of the shoulder groove 17 at an angle $\alpha$ with respect the first inclined part 171, which varies along the circumference of the tire. At the same time, the varying inclination angle $\alpha$, which is the angle formed by the first inclined part 171 and the second inclined part 172 is set as $0° \leq \alpha < 20°$. And the inclination angles of the first and second inclined parts 171, 172 are set such that the maximum value $\alpha_{max}$ and the minimum value $\alpha_{min}$ of the varying inclination angle $\alpha$ satisfy $(D-d)(\tan \alpha_{max} - \tan \alpha_{min}) \geq 2.5$ (D: groove depth of the shoulder groove 17, d: boundary depth). This not only improves the performance against irregular wear in the shoulder land portion 19, but also can effectively reduce the occurrence of cracking in the shoulder groove 17.

Also, the boundary depth d is set within a range of $0.1 < (d/D) < 0.6$. Accordingly, further improvement is made in the effect of controlling irregular wear in the shoulder land portion 19 and the effect of reducing the occurrence of cracking in the shoulder groove 17.

Example 1

Tires of the present invention as shown in FIG. 1 (Invention 1 and Invention 2), a tire with the groove wall surface on the shoulder land portion side of the shoulder grooves having no inclined part (Conventional example), a tire whose $\Delta\alpha$ is 2.5 or less (Comparative example 1), a tire whose (d/D) is 0.1 or less (Comparative example 2), and a tire whose (d/D) is 0.6 or more (Comparative example 3) were prepared. And each of these tires was fitted to a test vehicle, and performance tests to determine their anti-irregular-wear characteristic and anti-rib-tear characteristic (curb hitting count before cracking in the shoulder groove) were carried out. The results are shown in the table of FIG. 3.

Tire of Invention 1: (d/D)=0.36, $\Delta\alpha$=3.1
Tire of Invention 2: (d/D)=0.40, $\Delta\alpha$=2.7

The tire size was 295/75R22.5, which is the mainly used size in North America. The rim used was 8.25×22.5 (standard rim size). The tire's internal pressure and load employed were the normal internal pressure and load of TRA.

To determine the anti-irregular-wear characteristic, 16 vehicles and 32 test tires were prepared for each of three users, which means a total of 96 tires were prepared for the three users. And a market evaluation was conducted regarding the presence/absence of the initial-stage nucleus of irregular wear in the inside shoulder of the tire and the progress of irregular wear thereafter. In the market evaluation, all the test vehicles for each of the users were placed under a constancy management of vehicular alignment, running route, internal pressure, etc., in order to avoid error factors other than those in specifications as far as practicable. Also, the following running distances were selected as target distances for the evaluations with the tires:

1st appraisal: 30,000 miles
2nd appraisal: 80,000 miles
3rd appraisal: 130,000 miles
4th appraisal: 180,000 miles Prior to the rib tear test, a degradation process was applied to the tires to hasten the occurrence of rib tear. That is, the tires were sufficiently degraded by placing them in a test chamber, called a constant temperature chamber, of 80 degrees Centigrade for seven days. Then the degraded tires were fitted to the test vehicles, and after the belt edge temperature was raised to 65 degrees Centigrade by normal running or circular turning of the vehicle, driving over a 15-centimeter-high curb at a hitting angle of 15 degrees was repeated. Thus the performance of the tires was determined in terms of the curb hitting count before the occurrence of failure.

It is to be noted that the rubber type used for all the test tires, which has varying specifications, was the same.

The greater the curb hitting count before rib tear, which is the number of times the tire hit the curb before rib tear, the better the anti-rib-tear characteristic is.

Since the irregular wear vol. is the irregular wear ratio per unit volume, the smaller the value is, the better.

As is evident in the table of FIG. 3, it has been confirmed that all the tires according to the present invention excel not only in the anti-rib-tear characteristic but also in the anti-irregular-wear characteristic.

In contrast to this, the tire whose $\Delta\alpha$ is 2.5 or less (Comparative example 1) does not show the characteristic improvement comparable to that of the tire according to the invention although it shows slightly improved anti-rib-tear characteristic and anti-irregular-wear characteristic over the conventional example.

Also, the tire whose (d/D) is 0.1 or less (Comparative example 2) shows an improved anti-rib-tear characteristic but an anti-irregular-wear characteristic inferior to that of the conventional example. The tire whose (d/D) is 0.6 or more (Comparative example 3) shows the anti-rib-tear characteristic and the anti-irregular-wear characteristic almost equal to those of the conventional example although it shows less irregular wear in the initial stage.

Second Embodiment

Figure 4A:
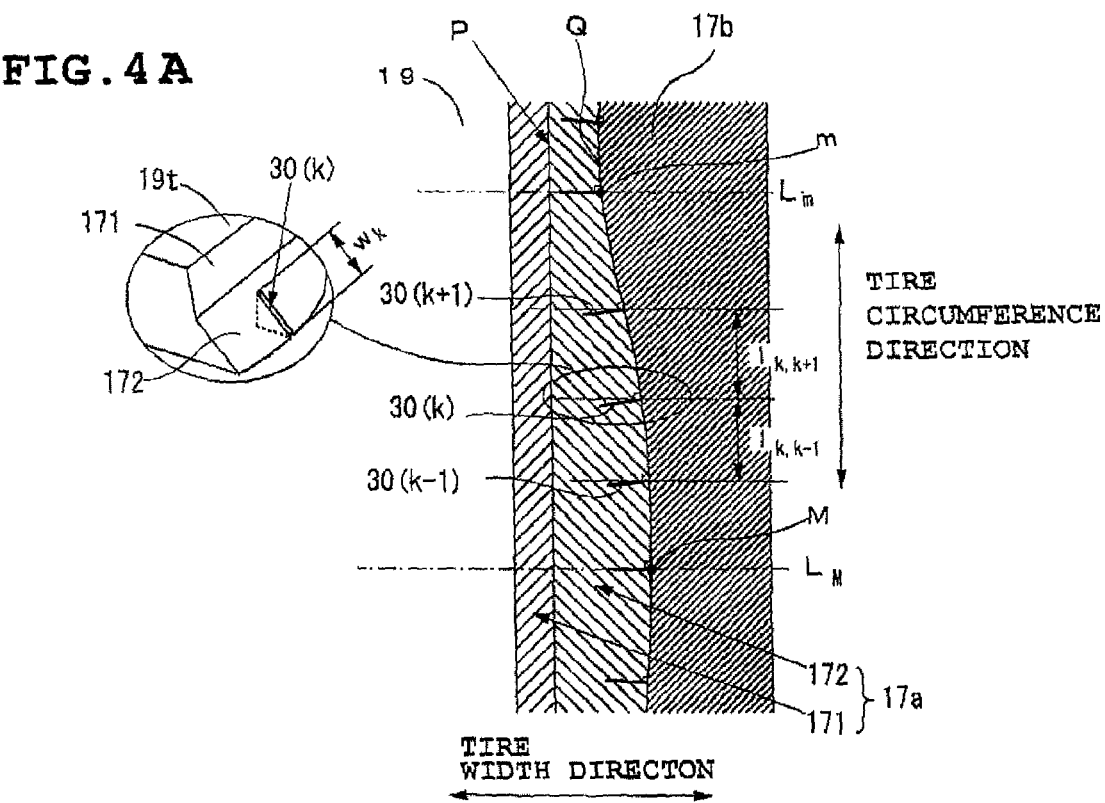
FIGS. 4A and 4B are diagrams showing the shapes of a groove wall surface of a shoulder groove according to a second embodiment of the invention.
Figure 4B:
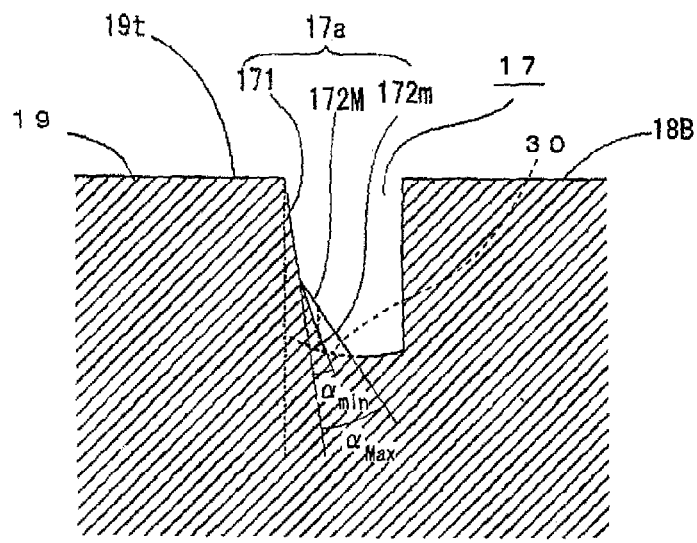

In the first embodiment, the shoulder land portion 19 is provided with land-portion sipes 20 extending in a direction perpendicular to the groove wall surface 17a of the shoulder groove 17 and opening into the shoulder groove 17 in order to control irregular wear in the shoulder land portion 19. However, if a plurality of sipes 30 arranged along the circumference of the tire and opening into the shoulder groove 17 are formed in the second inclined part 172 as shown in FIGS. 4A and 4B, then it is not only possible to control the concentration of strain in the groove bottom 17b from the middle to the terminal stage, but also to suppress the increase of shearing force when any lateral force is inputted. Thus, it is possible to further control the occurrence of rib tear and irregular wear in the shoulder portions.

FIG. 4A is diagrams showing the shapes of the groove wall surface 17a of the shoulder groove 17. FIG. 4B is a sectional view seeing the position of the maximum value $\alpha_{max}$ of the varying inclination angle $\alpha$ from that of the minimum value $\alpha_{min}$ thereof. Hereinafter, the sipes 30 will be referred to as groove-bottom sipes.

One end of each groove-bottom sipe 30 opens into the shoulder groove 17, whereas the other end thereof terminates within the second inclined part 172. A plurality of the groove-bottom sipes 30 are arranged along the circumference of the tire such that the direction of extension thereof (the tire width direction of extension thereof) as seen from the tread face side of the tire is perpendicular to the curved line Q connecting the boundary points q between the groove bottom 17b of the shoulder groove 17 and the second inclined part 172.

In this manner, it is important that each of the groove-bottom sipes 30 be so formed as to be perpendicular to the curved line Q. In other words, failure to form the groove-bottom sipes 30 perpendicularly to the curved line Q can cause so-called "sipe tear" in which cracking starts from the groove-bottom sipe 30. Therefore, as in this embodiment, the groove-bottom sipes 30 are to be formed in such a manner that the orientation angles thereof to the tire width direction are varied according to the variation in the varying inclination angle $\alpha$ so as to orient the groove-bottom sipes 30 perpendicular to the curved line Q. Then it is not only possible to achieve the effect of suppressing the shearing force when any lateral force is inputted while retaining necessary rigidity of the tire, but also to prevent the occurrence of sipe tears.

In the present embodiment, the groove-bottom sipes 30 are located at regular intervals along the circumference of the tire, but they may also be located at irregular intervals. In such a case, however, it is preferable that the sipe interval I is maintained constant at least for a certain continuous length along the circumference of the tire (e.g., 30 mm) instead of using a completely random arrangement of the groove-bottom sipes 30. Note that the sipe interval I is the distance along the circumference of the tire between the openings of mutually adjacent groove-bottom sipes 30, 30.

It is also preferable that I and w satisfy 1.5<(I/w)<4 where w is the length of the groove-bottom sipe 30 along the groove wall surface 17a (hereinafter referred to as "length") and I is the sipe interval.

Also, when the groove-bottom sipes 30 are arranged at irregular intervals, it is preferable that $w_k$, $I_{k,k+1}$, and satisfy 1.5<($I_{k,k-1}/w_k$)<4 and 1.5<($I_{k,k+1}/w_k$)<4 where $w_k$ is the length of the kth groove-bottom sipe 30(k), and $I_{k,k-1}$ and $I_{k,k+1}$ are the respective sipe intervals between the groove-bottom sipe 30(k) and the adjacent groove-bottom sipes 30(k−1) and 30(k+1) as shown in FIG. 4A.

When (I/w) is 1.5 or less, that is, when the density of the groove-bottom sipes 30 is too high or the length of the groove-bottom sipes 30 is too long, the total inner volume of the groove-bottom sipes 30 provided in the groove wall surface 17a is large. Then the rigidity of the second inclined part 172 is insufficient, and consequently the sipe tear is more likely to occur when a large lateral force is inputted.

On the other hand, when (I/w) is 4 or more, that is, when the density of the groove-bottom sipes 30 is too low or the length of the groove-bottom sipes 30 is too short, the total inner volume of the groove-bottom sipes 30 provided in the second inclined part 172 is small. Then the rigidity of the second inclined part 172 is too high, and there will be an insufficient effect of controlling the shear force when a large lateral force is inputted. As a result, there will be an insufficient effect of controlling irregular wear in the shoulder regions. Therefore, it is preferable that I and w are so set as to satisfy 1.5<(I/w)<4.

Example 2

Tires without the groove-bottom sipes as shown in FIG. 1 (Invention 1 and Invention 2), tires having the groove-bottom sipes as shown in FIGS. 4A and 4B (Invention 3 and Invention 4), a tire with the groove wall surface on the shoulder land portion side of the shoulder grooves having no inclined part (Conventional example), and a tire which have the groove-bottom sipes but whose (D−d) Δ is less than 2.5 (Comparative example 4) were prepared. And each of these tires was fitted to a test vehicle, and performance tests to determine their anti-irregular-wear characteristic, anti-rib-tear characteristic (curb hitting count before cracking in the shoulder groove), and anti-sipe-tear characteristic were carried out. The results are shown in FIGS. 5A and 5B.

The description of the tires, the rim used, the internal pressure of the tires, the load, and the testing and evaluation methods, which were the same as those of Example 1, is omitted. Note that the level of sipe tear occurrences was evaluated in terms of the presence/absence of sipe tear after 180,000 miles of vehicular run.

As is evident in the tables of FIG. 5, it has been confirmed that all the tires according to the present invention, which showed no occurrence of sipe tear, excel not only in anti-rib-tear characteristic but also in anti-irregular-wear characteristic. In particular, it has been confirmed that the tires having groove-bottom sipes (Invention 3 and Invention 4), compared with the tires without the groove-bottom sipes (Invention 1 and Invention 2), exhibit improvement in the effect of reducing the occurrence of rib tear from the middle to the terminal stage and the effect of controlling irregular wear in the shoulder regions.

In contrast to this, the tire whose (D−d) Δ is less than 2.5 (Comparative example 4) does not show characteristic improvements comparable to those of the Invention 1-4 tires, despite the provision of the groove-bottom sipes.

In the foregoing specification, the invention has been described with reference to specific embodiments thereof. However, the technical scope of this invention is not to be considered as limited to those embodiments. It will be evident to those skilled in the art that various modifications and changes may be made thereto without departing from the broader spirit and scope of the invention. It will also be evident from the scope of the appended claims that all such modifications are intended to be included within the technical scope of this invention.

INDUSTRIAL APPLICABILITY

As described above, the present invention realizes simultaneously an improvement in the anti-irregular-wear characteristics of the shoulder land portions and a reduction of the occurrence of cracking in the shoulder grooves. Therefore, the durability performance of a tire can be enhanced greatly.

DESCRIPTION OF REFERENCE NUMERALS 10 pneumatic tire
11 bead portion
11C bead core 12 carcass layer
13 belt layers
13a-13c belt
14 tread
15 sidewall
16 main groove
17 shoulder groove
17a groove wall surface
17b groove bottom
171 first inclined part
172 second inclined part
18A central land portion
18B outer land portion
19 shoulder land portion
19t tread face
20 land-portion sipe
30 groove-bottom sipe

The invention claimed is:

1. A pneumatic tire comprising:
a tread having, on a surface thereof, a plurality of circumferential grooves, which extend along a circumference of the tire, and shoulder land portions defined by shoulder grooves, which are circumferential grooves located in axially outermost positions of the circumferential grooves,
wherein a groove wall surface located on the shoulder land portion side of the shoulder groove has a first inclined part, which is inclined toward an equatorial plane of the tire from a direction perpendicular to a tread face of the shoulder land portion, and a second inclined part, which is further inclined toward the equatorial plane from the first inclined part and reaches a bottom of the shoulder groove,
wherein an inclination angle of the first inclined part is constant along the circumference of the tire and an angle $\alpha$ formed by the first inclined part and the second inclined part varies along the circumference of the tire, and
wherein a maximum value $\alpha_{max}$ and a minimum value $\alpha_{min}$ of the angle $\alpha$ satisfy $(D-d)(\tan \alpha_{max} - \tan \alpha_{min}) \geq 2.5$ mm,
where D is a depth from the tread face to the bottom of the shoulder groove,
d is a depth from the tread face to a boundary position between the first inclined part and the second inclined part,
$\alpha_{max}$ is a maximum value of the angle $\alpha$, and
$\alpha_{min}$ is a minimum value of the angle $\alpha$,
wherein the depth d satisfies $0.1 < (d/D) < 0.4$,
wherein the second inclined part has a plurality of groove-bottom sipes which are arranged along the circumference of the tire and open into the shoulder groove,
wherein I and w satisfy $1.5 < (I/w) < 4$ where w is a length of each groove-bottom sipe along the groove wall surface and I is an interval between an opening of a groove-bottom sipe and an opening of a groove-bottom sipe adjacent thereto along the circumference of the tire, and
wherein the plurality of groove-bottom sipes is provided only in the second inclined part and wherein the shoulder land portions do not have land-portion sipes.

2. The pneumatic tire according to claim 1, wherein an inclination angle $\theta_1$ of the first inclined part is within a range of $0° < \theta_1 \leq 10°$ and the angle $\alpha$ is within a range of $0° = \alpha < 20°$.

3. The pneumatic tire according to claim 1, wherein a direction of extension (a tire width direction) of each of the groove-bottom sipes as viewed from a tread face side of the tire is perpendicular to a straight line or a curved line connecting boundary points between the groove bottom of the shoulder groove and the second inclined part.

\* \* \* \* \*